US008714347B2

(12) United States Patent
Mongan et al.

(10) Patent No.: US 8,714,347 B2
(45) Date of Patent: May 6, 2014

(54) ELECTRONIC DEVICE CASE WITH RETRACTABLE STAND

(75) Inventors: Ryan Hill Mongan, Orange, CA (US); Jarret Weis, San Francisco, CA (US); Bryan Lee Hynecek, Redwood City, CA (US); Arthur Wu, San Francisco, CA (US)

(73) Assignee: Speculative Product Design, LLC, Mountain View, CA (US)

( * ) Notice: Subject to any disclaimer, the term of this patent is extended or adjusted under 35 U.S.C. 154(b) by 0 days.

(21) Appl. No.: 13/350,682

(22) Filed: Jan. 13, 2012

(65) Prior Publication Data

US 2012/0181196 A1 Jul. 19, 2012

Related U.S. Application Data (60) Provisional application No. 61/461,134, filed on Jan. 14, 2011.

(51) Int. Cl.
*B65D 5/52* (2006.01)
*B65D 25/24* (2006.01)

(52) U.S. Cl.
USPC .................................................. 206/45.24

(58) Field of Classification Search
USPC .............. 206/320, 576, 45.24, 45.2; 248/460, 248/463, 149, 150, 450
See application file for complete search history.

(56) References Cited

U.S. PATENT DOCUMENTS

| | | | | |
|---|---|---|---|---|
| 2,256,015 A * | 9/1941 | Carver | | 248/472 |
| 4,666,036 A * | 5/1987 | Bourbon | | 206/45.23 |
| 7,593,222 B2 * | 9/2009 | Zbikowski | | 361/679.41 |
| 8,016,107 B2 * | 9/2011 | Emsky | | 206/320 |
| 8,132,670 B1 * | 3/2012 | Chen | | 206/320 |
| 8,146,722 B1 * | 4/2012 | Moreno et al. | | 190/18 A |
| 8,201,687 B2 * | 6/2012 | Zeliff et al. | | 206/320 |
| 2002/0063072 A1 * | 5/2002 | Pham | | 206/320 |
| 2002/0134697 A1 * | 9/2002 | Barnett | | 206/320 |
| 2010/0224532 A1 * | 9/2010 | Gonzalez | | 206/576 |
| 2011/0266176 A1 * | 11/2011 | Still | | 206/320 |

FOREIGN PATENT DOCUMENTS

| | | |
|---|---|---|
| KR | 20-0235532 | 10/2001 |
| KR | 10-2004-0095406 | 11/2004 |
| KR | 10-2006-0071001 | 6/2006 |

OTHER PUBLICATIONS

International Search Report and Written Opinion dated Aug. 28, 2012 in corresponding International Application PCT/US12/21360, 5pages.
KR 10-2004-0095406, published Nov. 15, 2004, computer generated English translation, 5 pages.
KR 10-2006-0071001, published Jun. 26, 2006, computer generated English translation, 9 pages.
KR 20-0235532, published Oct. 10, 2001, computer generated English translation, 4 pages.

* cited by examiner

*Primary Examiner* — Jacob K Ackun
(74) *Attorney, Agent, or Firm* — Frommer Lawrence & Haug LLP (57) ABSTRACT

A case for an electronic device with a retractable stand may support the case for an inserted electronic device when disposed in a horizontal and/or vertical position. The case may be transitioned from the horizontal and/or vertical disposition and vise-versa without changing the relative positions of the case and the stand to one another.

17 Claims, 8 Drawing Sheets

ELECTRONIC DEVICE CASE WITH RETRACTABLE STAND

RELATED APPLICATIONS

This application is a NONPROVISIONAL of, claims priority to, and incorporates by reference in its entirety U.S. Provisional Patent Application 61/461,134 filed Jan. 14, 2011.

FIELD OF THE INVENTION

The present invention relates to a case for enclosing an electronic device. More specifically, the present invention relates to a case that includes a stand for supporting the case when positioned in a horizontal and/or vertical (e.g., in a landscape or portrait) position.

BACKGROUND

As electronic devices such as mobile phones and tablet computers have become more powerful, users often employ them for prolonged periods of time in order to, for example, watch audio-video media (e.g. movies or television shows) or engage in video conferencing. While employing the electronic device for these prolonged periods, it is convenient to prop the device up so that the user does not have to hold the device continuously. Likewise, when engaging in video conferencing, it is useful to prop the electronic device up so that a camera included in the electronic device is held steady so that a recipient of a video transmission from the electronic device does not see a shaky image caused by handholding the electronic device.

Cases for electronic devices that include a deployable stand for propping up an inserted electronic device are known in the art. However, these stands are placed on the outside of the cases and are similar to the hinged stands included in a desktop picture frame. One drawback to cases employing this type of stand includes the significant bulk an external hinged stand adds to the overall bulk of the case. Also, stands residing on the outside of a case for an electronic device are susceptible to breakage and separation from the case.

SUMMARY

Cases for covering an exterior surface of an inserted electronic device that include a stand for supporting the case and inserted electronic device while disposed in a vertically and/or horizontally (e.g., landscape or portrait) oriented position are herein disclosed. An exemplary case may include a covering, a channel, and a stand. On some occasions, the case may include a feature, such as an aperture, button, and/or opening sized and positioned to align with a component (e.g., button, switch, touch screen) of the inserted electronic device and thereby enable access to the component by a user of the electronic device.

The covering may include a bottom surface and side surfaces joined to the bottom surface and extending upward therefrom and may thereby form a fitted cavity configured to accept and retain the inserted electronic device. The bottom surface of the covering may cover a bottom surface of the inserted electronic device and the side surfaces may cover a portion of the side surfaces of the inserted electronic device. The covering may be manufactured from, for example, plastic, metal, silicon, rubber, a polymer, a cellulitic material, a ceramic material, a glass material, a biomaterial, a nanomaterial, a composite material, a polycarbonate material and/or a para-aramid material.

The channel may be positioned adjacent to the bottom surface of the covering and may be configured to enable an extension of the stand from a first, or closed, position to a second, or extended, position and a retraction of the stand from the second position to the first position. On some occasions, the extension and/or retraction of the stand within the channel may be linear.

The stand may be configured to extend out of the channel from the first position to the second position and retract into the channel from the second position to the first position. The extension of stand may be linear and, at times, some or all of the stand may extend outside of the case and/or channel when it is extended into the second position.

The stand may also be arranged in a third, or supporting, position. When the stand is arranged in the third position, it may support the case and the inserted electronic device in, for example, a horizontally and/or vertically oriented position. The stand may include a mechanism, such as a stop, hinge, or other attachment that enables the stand to remain in the third position.

The stand may also include a hinge configured to enable the stand to bend away from the covering when transitioning from the second position to the third position and bend toward the covering when transitioning from the third position to the second position. In some embodiments, a biasing member may be attached to the stand and/or case. The biasing member may enable extension of the stand from the first position to the second position and the retraction from the second position to the first position within the channel.

In some embodiments, a membrane or inner layer may be positioned between the inserted electronic device and the channel. The membrane/inner layer may act to, for example, prevent contact between the stand and the back of an inserted electronic device during its extension out of and/or retraction into the channel.

Another exemplary case may include a covering and a stand. The covering may include a bottom surface and side surfaces joined to the bottom surface and extending upward therefrom, thereby forming a fitted cavity configured to accept and retain the inserted electronic device such that the bottom surface of the covering covers a bottom surface of the inserted electronic device and the side surfaces cover at least a portion of side surfaces of the inserted electronic device. The covering may further include an opening configured to enable an extension of the stand from a first position to a second position and a retraction of the stand from the second position to the first position. The stand may be configured to extend into the first position and retract into the second position via the opening. The stand may be further configured to be arranged in a third, or supporting position, wherein positioning the stand in the third position enables the stand to support the case and the inserted electronic device in, for example, a vertically and/or horizontally oriented position.

Another exemplary case for enclosing an electronic device may include a flexible inner layer, an exterior hard layer that is permanently affixed to the flexible inner layer, and a stand for supporting the case in at least one of a horizontally oriented position and a vertically oriented position. The case may be sufficiently flexible to deform and thereby accept insertion of the electronic device and sufficiently rigid to reform around and securely retain the inserted electronic device.

The flexible inner layer may include a bottom surface and side surfaces joined to the bottom surface that extending upward therefrom, thereby forming a fitted cavity and a top surface of an adjacent channel. The fitted cavity may be configured to accept and retain the inserted electronic device such that the bottom surface of the flexible inner layer covers a bottom surface of the inserted electronic device and the side surfaces cover at least a portion of side surfaces of the inserted electronic device.

The exterior hard layer may include a bottom surface and side surfaces joined to the bottom surface and extending upward therefrom. The bottom surface of the exterior hard layer may form a bottom surface of the channel and a portion of the side surfaces of the exterior hard layer may substantially cover the side portions of the flexible inner layer. The channel may be configured to enable an extension of the stand from a first position to a second position and a retraction of the stand from the second position to the first position.

The stand may be configured to extend from the first position to the second position and retract from the second position to the first position via the channel. The stand may further configured to be positioned in a third position, wherein arranging the stand in the third position supports the case and the inserted electronic device in at least one of the horizontally oriented position and a vertically oriented position.

In one embodiment, at least one side surface of the exterior hard layer may include a cut-away portion that contributes to the overall flexibility of the case.

In another embodiment, a side surface of the exterior hard layer may include a cut-away portion and the flexible inner layer may extend into the cut-away portion, wherein the cut-away portion and the extension of the flexible inner layer contribute to the overall flexibility of the case.

In some embodiments, a portion of a corner or corners between at least two of the side surfaces of the exterior hard layer may be cut away, thereby creating a cut-away portion and exposing an underlying portion of the flexible inner layer. The exposed flexible inner layer may then fill in the cut-away portion at the corner and the cut-away portion and the filled in portion of the flexible inner layer may contribute to the overall flexibility of the case. In some instances, the exposed flexible inner layer may fill in the cut-away portion at the corner thereby creating a stretch zone that is sufficiently flexible to enable the case to deform and thereby accept insertion of the electronic device.

In one embodiment, the case may include an overhang extending from a top portion of one or more of the side surfaces in parallel to the bottom surface of the case. The overhang may serve to retain an inserted electronic device within the case.

BRIEF DESCRIPTION OF THE DRAWINGS

The present application is illustrated by way of example, and not limitation, in the figures of the accompanying drawings, in which.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Figure 1:
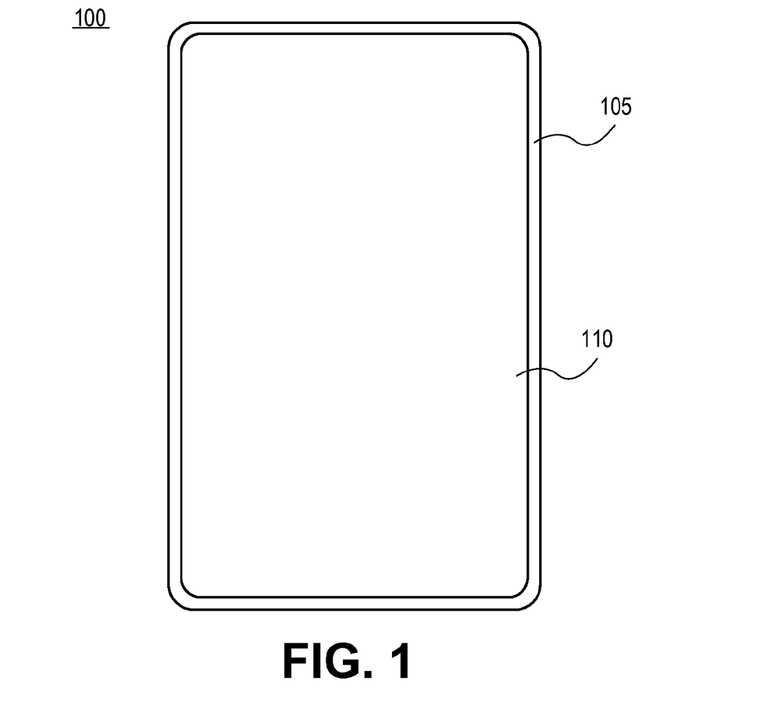
FIG. 1 illustrates a top view of an exemplary case in accordance with embodiments of the present invention.

FIG. 1 illustrates a top view of a case 100 with a stand for enclosing an electronic device including a covering 105 and a fitted cavity 110. Exemplary electronic devices include mobile telephones, so called "smart phones" (e.g., iPhone™ or Blackberry™), laptop computers, tablet computers, and the like. Case 100 and/or covering 105 may be manufactured from, for example, metal, a rigid, semi-rigid, or soft plastic material, silicon, a rubber material, a polycarbonate material, a polymer, a cellulitic material, a ceramic material, a glass material, a biomaterial, a nanomaterial, a composite material, a para-aramid material and/or any combination thereof and may be any color or texture. A polycarbonate material and/or a para-aramid material.

Fitted cavity 110 may be shaped and configured to accept and retain an inserted electronic device such that the bottom surface of the case covers a bottom surface of the inserted electronic device and the side surfaces of the case cover at least a portion of side surfaces of the inserted electronic device.

In some embodiments, case 100 may include an exterior hard layer and a flexible inner layer. The exterior hard layer may be covering 105 and may be fabricated from, for example, metal, a rigid or semi-rigid plastic material, a rigid rubber material, a polycarbonate material, a para-aramid material and/or some combination thereof and may be any color or texture and the flexible inner layer may be made from any appropriately flexible material, such as rubber, silicon, or plastic.

Figure 2:
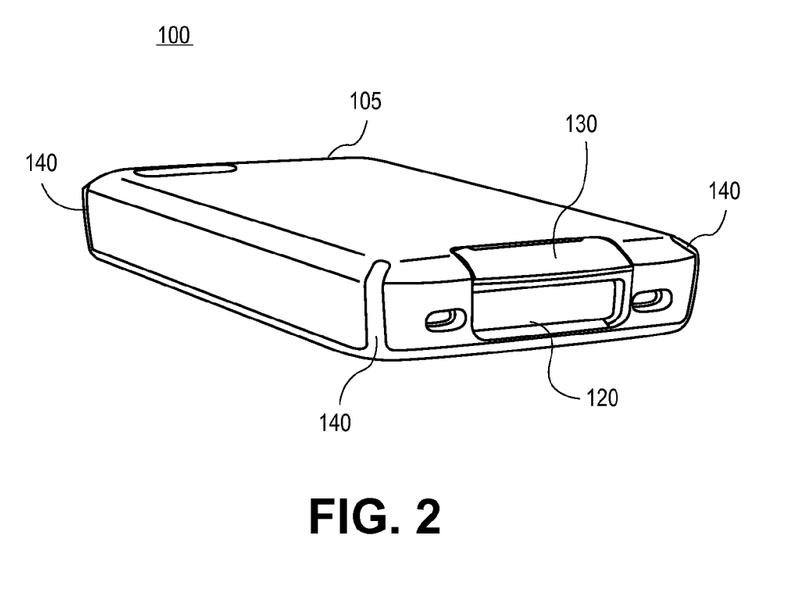
FIG. 2 illustrates a side perspective view of an exemplary case in accordance with embodiments of the present invention.

On some occasions, case 100 may be customized to accommodate a particular type of electronic device. On these occasions, case 100 may include a feature, such as an aperture or other feature 120 sized and positioned to accommodate a component (e.g., touch screen, button, lever, etc.) of an inserted electronic device as shown in FIG. 2.

Optionally, covering 105 and/or the exterior hard layer may include one or more cut-away portions 140 that contribute to the overall flexibility of case 100. In one embodiment, a cut away portion 140 may be present at the four corners of case 100. On some occasions, the flexible inner layer may fill in a portion of cut away portion 140. This may enable covering 105 and/or the exterior hard layer to sufficiently flex or deform to accept an inserted electronic device and reform around the inserted electronic device.

Figure 3:
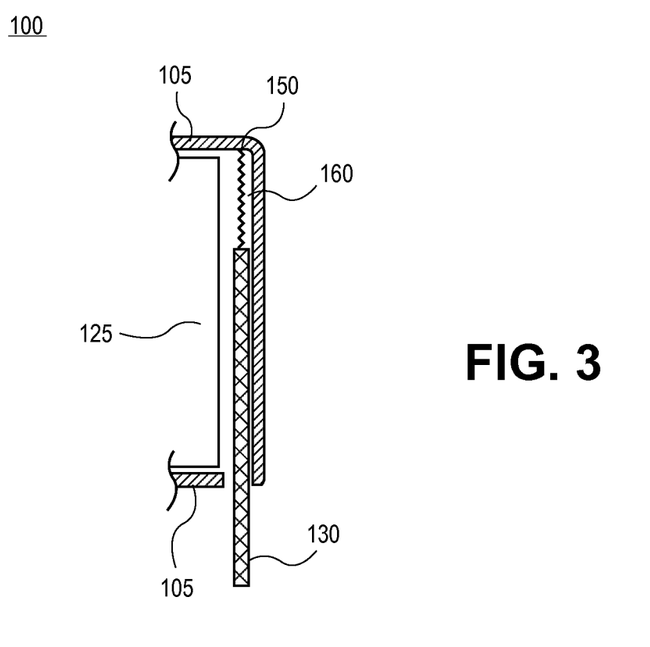
FIGS. 3 and 4 illustrate cross sections of exemplary cases in accordance with embodiments of the present invention.
Figure 4:
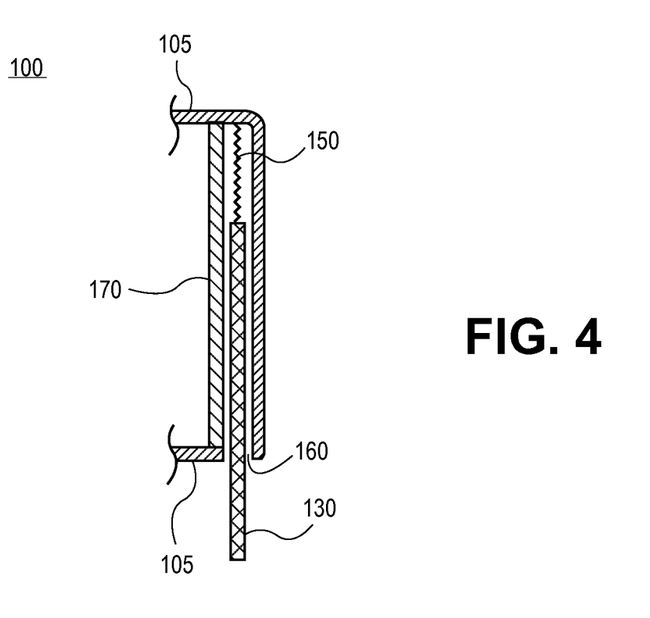

Case 100 may also include a stand 130 positioned within a channel 160 as shown in FIGS. 3 and 4. Stand 130 may be attached to case 100 and/or channel 160 via any conventionally available means including, but not limited to, a biasing member 150. Exemplary biasing members 150 include springs, elastic cords, extension coil springs, beam springs, hinges, materials folded in an expandable or accordion-like fashion, a compressible material, a stretchable material, and a flexible material. Stand 130 may extend out of channel 160 and/or retract into channel 160 in, for example, a linear fashion, via biasing member 150. On some occasions, biasing member 150 may act to automatically retract stand 130 into channel 160 unless a counter retaining or extending force is applied to stand 130.

As depicted in FIG. 3, channel 160 is directly adjacent to a back surface of inserted electronic device 120. On some occasions, channel 160 may be designed so that stand 130 does not contact the back surface of electronic device 120 when extended out of and/or retracted into channel 160.

As depicted in FIG. 4, channel 160 is separated from back surface of inserted electronic device 120 by a membrane 170. Membrane 170 may serve to prevent stand 130 from contacting the back surface of electronic device 120 when extended out of and/or retracted into channel 160. Membrane 170 may be manufactured from, for example, a thin plastic or rubber film. In embodiments where case 100 includes a hard exterior layer and a flexible inner layer, membrane 170 may be a portion of the flexible inner layer.

Figure 5:
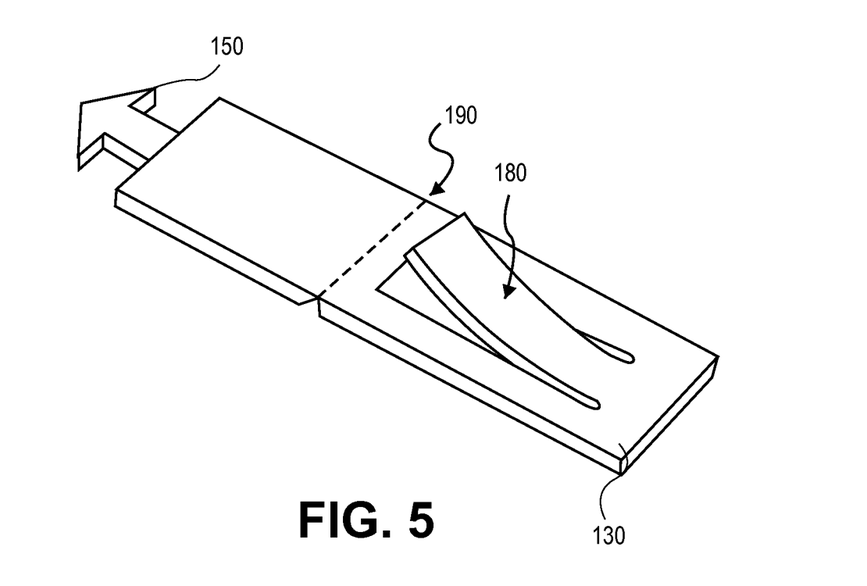
FIG. 5 illustrates an exemplary stand in accordance with embodiments of the present invention.

FIG. 5 depicts an exemplary stand 130 including biasing member 150, a mechanism 180, and a hinge 190. Stand 130 may be manufactured from, for example, plastic, metal, or rubber and may be configured to support an inserted electronic device when disposed in a vertical and/or horizontal (e.g., portrait and/or landscape) orientation without changing the relative positions of stand 130 and case 100. Hinge 190 may be, for example, a portion of stand 130 that is sufficiently thin to enable stand 130 to bend. Hinge 190 may also be an element separate from stand 130 that joins two portions of stand 130 to one another and enables stand 130 to bend.

Mechanism 180 may be a portion of stand 130 and/or an element attached to stand 130 and may be configured to enable stand 130 to remain in a position that supports the inserted electronic device when deployed. In one embodiment, stand 130 may be molded in one piece and mechanism 180 may be molded out of plane with the remainder of stand 130 so that when stand 130 is retracted in channel 160, mechanism 180 returns to the same plane as stand 130 and when stand 130 is extended out of channel 160, mechanism 180 is out of plane with the remainder of stand 130.

Figure 6:
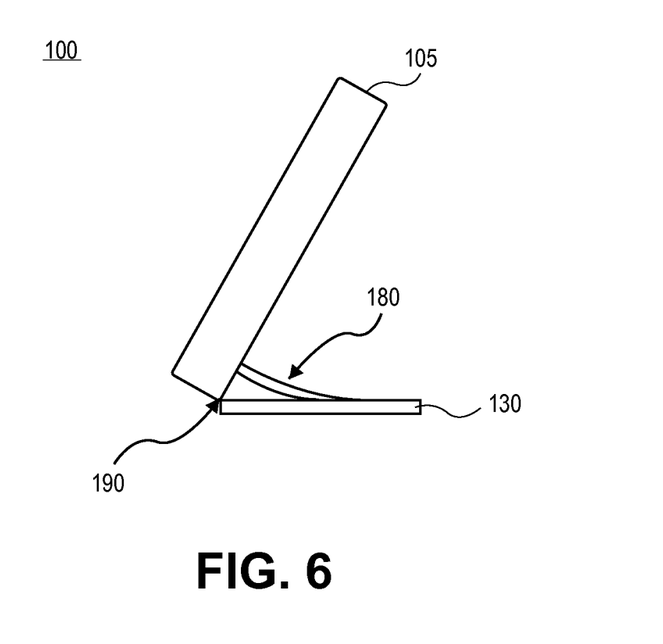
FIGS. 6 and 7 illustrate of exemplary cases with a deployed stand in accordance with embodiments of the present invention.
Figure 7:
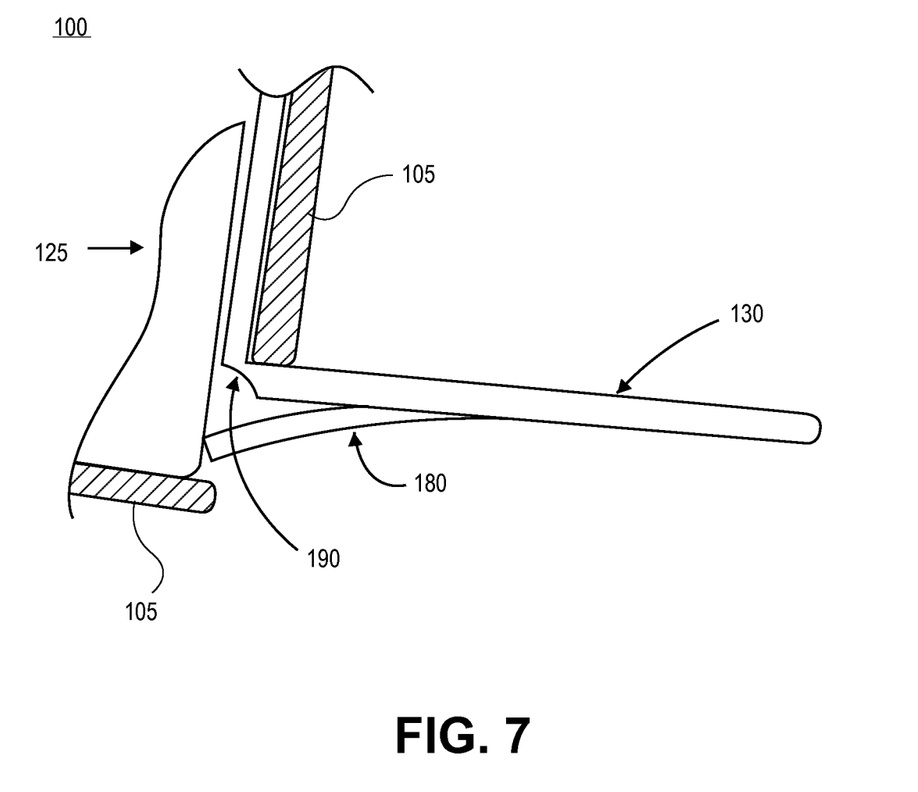

FIGS. 6 and 7 depict exemplary cases 100 wherein stand 130 is extended out of channel 160 and positioned in a supporting position via bending of hinge 190 and deployment of mechanism 180 for maintaining the relative positions of case 100 and stand 130. In the example of FIG. 6, mechanism 180 is positioned at an angle above stand 130 while in the example of FIG. 7, mechanism 180 is positioned at an angle below stand 130.

Figure 8A:
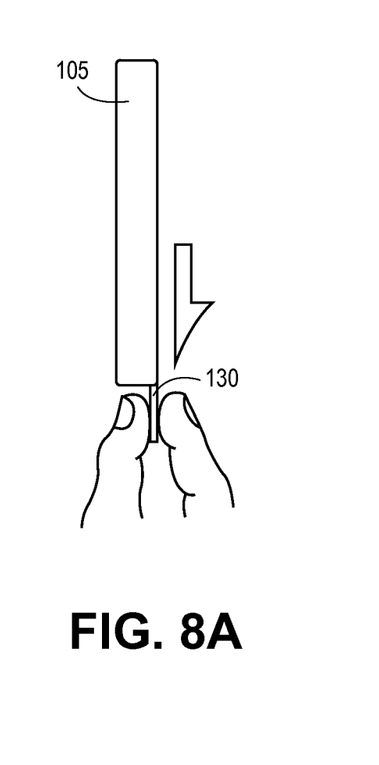
FIGS. 8A-8D illustrate a process for deploying a stand in accordance with embodiments of the present invention.
Figure 8B:
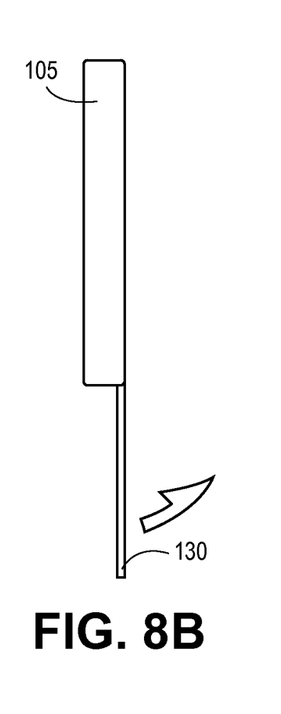
Figure 8C:
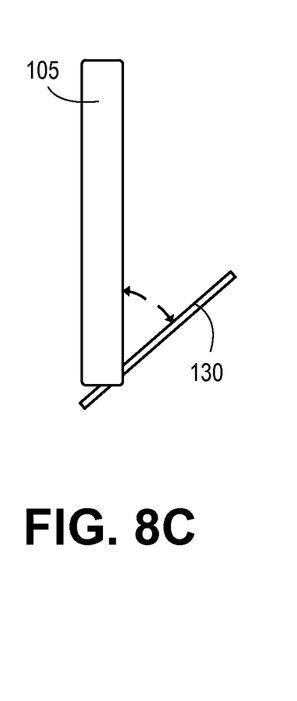
Figure 8D:
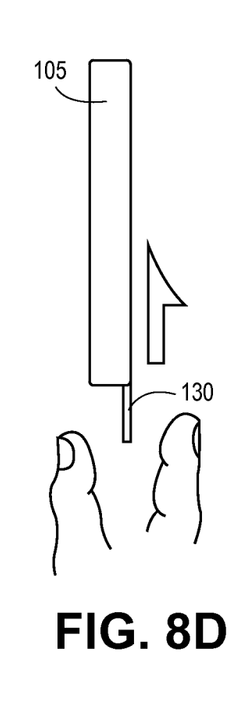

FIGS. 8A-8D depict an exemplary process for deploying stand 130 to support case 100 disposed in a horizontally and/or vertically oriented position and returning stand 130 into to a closed position. FIG. 8A depicts a linear extension of stand 130 from a first, or closed, position into a second, or extended, position. FIG. 8B depicts the lifting of stand into a third, or supporting, position and FIG. 8C depicts the stand in the third, or supporting, position. FIG. 8D depicts the return of stand 130 from the supporting position into the original, or first position.

Figure 9A:
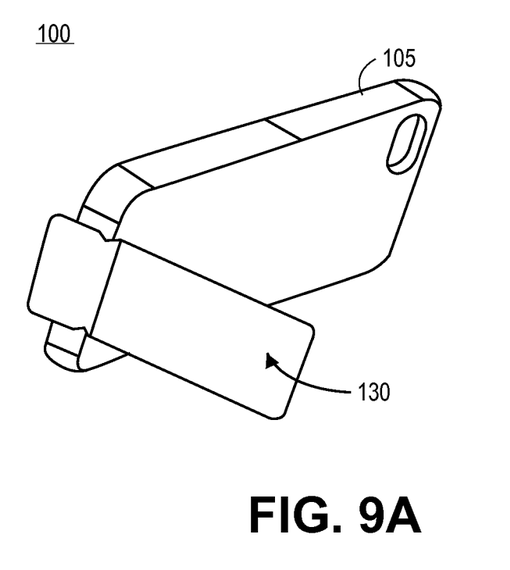
FIGS. 9A-9F illustrate various exemplary cases in accordance with embodiments of the present invention.
Figure 9B:
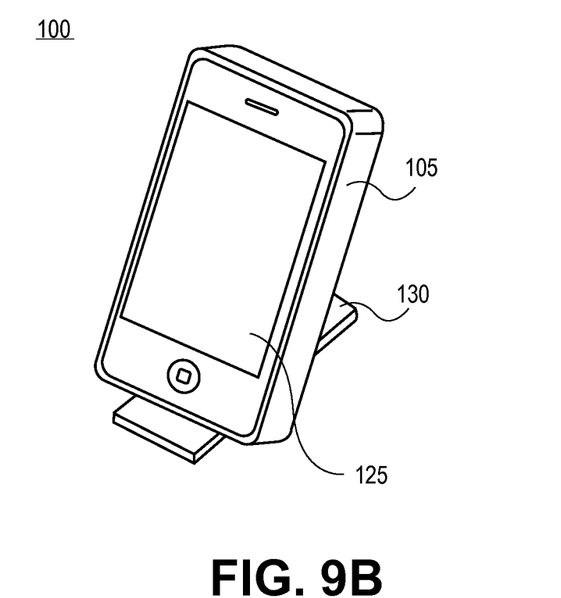
Figure 9C:
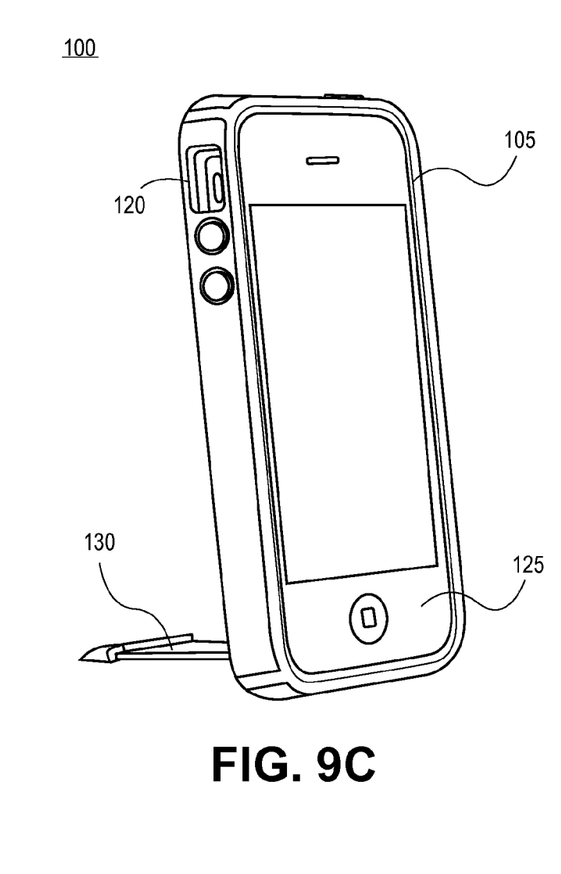
Figure 9D:
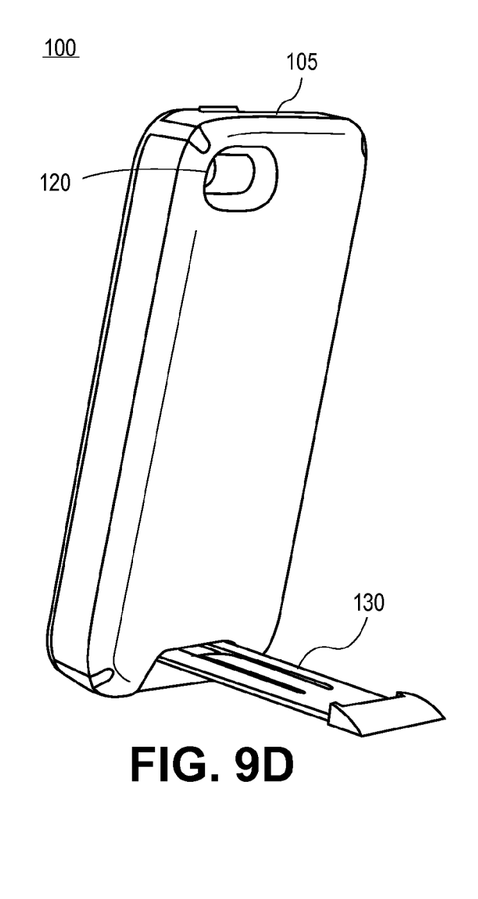
Figure 9E:
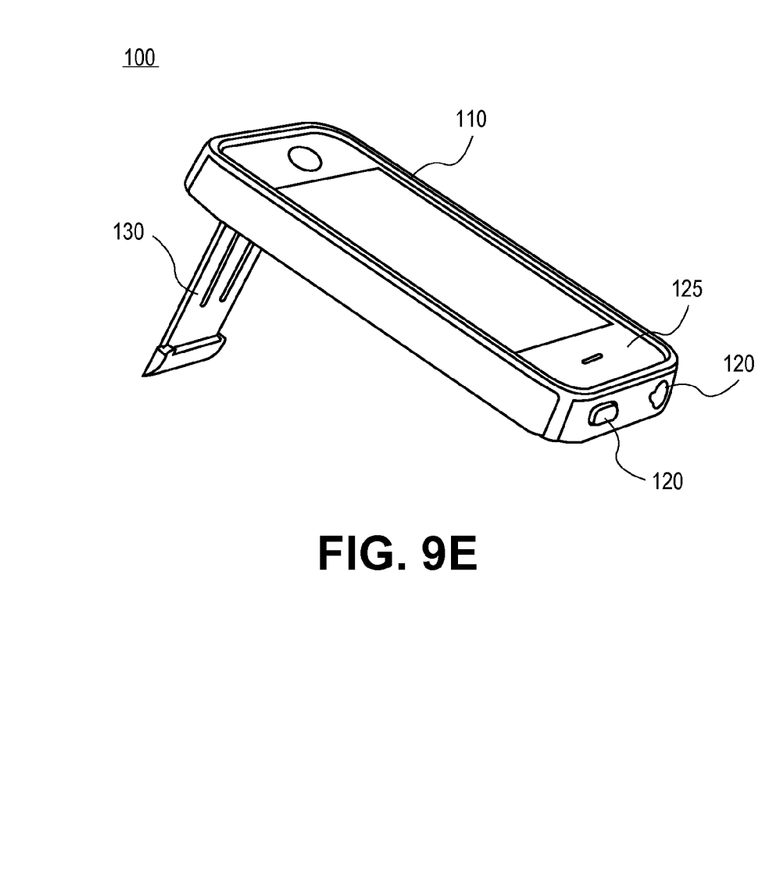
Figure 9F:
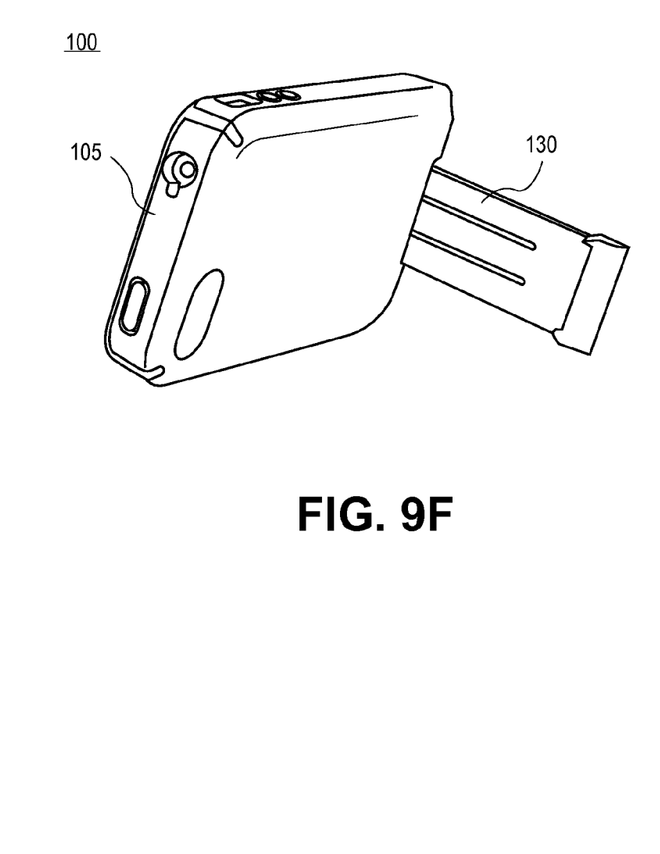

FIGS. 9A-9F depict various exemplary cases 100 with stand 130 deployed to support case 100 when disposed in a horizontal and/or vertical. FIG. 9A depicts case 100 supported in a horizontal position by deployed stand 130. FIGS. 9B-D depict case 100 with an inserted electronic device 125 supported in a vertical position by deployed stand 130 wherein the angle between case 100 and a surface supporting case 100 (e.g., table or desk top) is greater than forty-five degrees. FIG. 9E depicts case 100 supported in a vertical position by deployed stand 130 wherein the angle between case 100 and a surface supporting case 100 (e.g., table or desk top) is less than forty-five degrees. FIG. 9F depicts case 100 supported in a horizontal position by deployed stand 130.

Thus, a case that includes a stand for supporting the case disposed in a horizontally and/or vertically oriented position has been herein disclosed.

What is claimed is:

1. A case for enclosing a electronic device comprising a flexible inner layer, an exterior hard layer that is permanently affixed to the flexible inner layer, and a stand for supporting the case in at least one of a horizontally oriented position and a vertically oriented position, the case being sufficiently flexible to deform and thereby accept insertion of the electronic device and sufficiently rigid to reform around and securely retain the inserted electronic device, wherein:

the flexible inner layer includes a bottom surface and side surfaces joined to the bottom surface and extending upward therefrom, thereby forming a fitted cavity and a top surface of an adjacent channel, wherein the fitted cavity is configured to accept and retain the inserted electronic device such that the bottom surface of the flexible inner layer covers a bottom surface of the inserted electronic device and the side surfaces cover at least a portion of side surfaces of the inserted electronic device;

the exterior hard layer includes a bottom surface and side surfaces joined to the bottom surface and extending upward therefrom, wherein the bottom surface of the exterior hard layer forms a bottom surface of the channel and a portion of the side surfaces of the exterior hard layer substantially cover the side portions of the flexible inner layer, wherein the channel is configured to enable an extension of the stand from a first position to a second position and a retraction of the stand from the second position to the first position; and the stand configured to extend from the first position to the second position and retract from the second position to the first position via the channel, the stand further configured to be positioned in a third position, wherein arranging the stand in the third position supports the case and the inserted electronic device in at least one of the horizontally oriented position and a vertically oriented position.

2. The case of claim 1, wherein at least one side surface of the exterior hard layer includes a cut-away portion that contributes to the overall flexibility of the case.

3. The case of claim 1, wherein at least one side surface of the exterior hard layer includes a cut-away portion and the flexible inner layer extends into the cut-away portion, wherein the cut-away portion and the extension of the flexible inner layer contribute to the overall flexibility of the case.

4. The case of claim 1, wherein a portion of a corner between at least two of the side surfaces of the exterior hard layer is cut away thereby creating a cut-away portion and exposing an underlying portion of the flexible inner layer.

5. The case of claim 4, wherein the exposed flexible inner layer fills in the cut-away portion at the corner and the cut-away portion and the filled in portion of the flexible inner layer contribute to the overall flexibility of the case.

6. The case of claim 4, wherein the exposed flexible inner layer fills in the cut-away portion at the corner thereby creating a stretch zone that is sufficiently flexible to enable the case to deform and thereby accept insertion of the electronic device.

7. The case of claim 1, wherein a portion of the corners between the side surfaces of the exterior hard layer is cut away thereby exposing an underlying portion of the flexible inner layer.

8. The case of claim 1, wherein the case includes an overhang extending from a top portion of one or more of the side surfaces in parallel to the bottom surface of the case.

9. The case of claim 4 wherein the exposed flexible inner layer partially fills in the cut-away portion at the corner thereby creating a stretch zone that is sufficiently flexible to enable the case to deform and thereby accept insertion of the electronic device.

10. The case of claim 1, wherein the electronic device is a smartphone.

11. The case of claim 4, wherein the exposed flexible inner layer partially fills in the cut-away portion at the corner and the cut-away portion and the partially filled in portion of the flexible inner layer contribute to the overall flexibility of the case.

12. The case of claim 1 wherein the stand further comprises a hinge configured to enable the stand to bend away from the exterior hard layer when transitioning from the second position to the third position and bend toward the exterior hard layer when transitioning from the third position to the second position.

13. The case of claim 1 wherein the retraction of the stand from the second position to the first position occurs automatically when a counter retaining or extending force is removed from the stand.

14. The case of claim 1, further comprising:
   a biasing member attached to the stand and configured to enable the extension of the stand from the first position to the second position and the retraction of the stand from the second position to the first position within the channel.

15. The case of claim 1, wherein the stand includes a mechanism configured to enable the stand to remain in the third position.

16. The case of claim 15 wherein the mechanism is a flexible tab.

17. The case of claim 14 wherein the biasing member is selected from at least one of the following: hinges, a spring, an elastic cord, an extension coil spring, a beam spring, a material folded in an expandable or accordion-like fashion, a flexible material, a compressible material, a stretchable material, and a flexible material.

* * * * *